United States Patent

Taylor et al.

[11] 3,881,094
[45] Apr. 29, 1975

[54] SIGNAL FOR EVALUATING SAILBOAT PERFORMANCE

[75] Inventors: Lucian W. Taylor, Los Altos; John M. Yarborough, Jr., Palo Alto, both of Calif.

[73] Assignee: Velcon Filters, Inc., San Jose, Calif.

[22] Filed: July 5, 1973

[21] Appl. No.: 376,709

[52] U.S. Cl......... 235/150.2; 73/178 R; 235/92 PB; 235/92 NT; 235/150.26; 235/183
[51] Int. Cl...................... G06g 7/78; G06f 15/50
[58] Field of Search....... 235/150.2, 150.28, 92 NT, 235/92 PB, 92 TF, 92 FA, 152, 181, 183; 73/178, 187, 188, 189

[56] References Cited
UNITED STATES PATENTS

| | | | |
|---|---|---|---|
| 2,851,596 | 9/1958 | Hilton | 235/92 TF |
| 3,276,256 | 10/1966 | Rudasill et al. | 73/188 |
| 3,506,813 | 4/1970 | Trimble | 235/152 |
| 3,626,398 | 12/1971 | Owens et al. | 340/27 R |
| 3,659,086 | 4/1972 | Metcalf | 235/183 |
| 3,777,133 | 12/1973 | Beck et al. | 235/181 |
| 3,814,910 | 6/1974 | Palmieri et al. | 235/150.2 |

OTHER PUBLICATIONS

TMC (Technical Measurement Corporation, Model 400C, Computer of Average Transients (CAT) (1965).

*Primary Examiner*—Felix D. Gruber
*Attorney, Agent, or Firm*—David H. Wilson

[57] ABSTRACT

A system for evaluating sailboat performance comprising averaging circuits for producing average boat speed, average apparent wind speed and average apparent wind direction. Instantaneous values of the speed parameters are sampled at a predetermined frequency and a running average of N samples is generated by adding the most recent sample and discarding the oldest sample at periodic intervals. Display of the wind speed is delayed with respect to the display of boat speed to compensate for the effect of the inertia of the boat.

7 Claims, 7 Drawing Figures

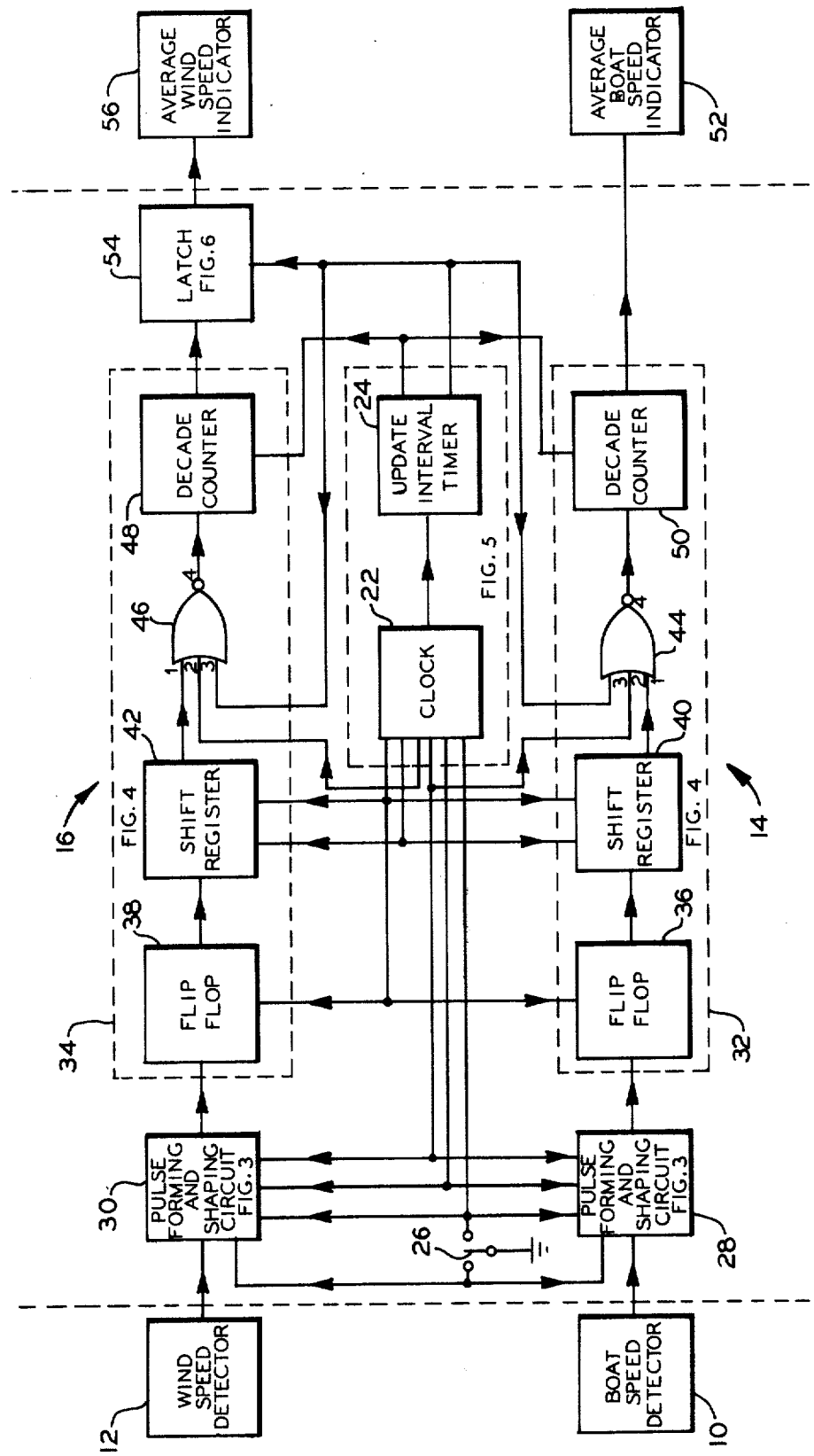

SIGNAL FOR EVALUATING SAILBOAT PERFORMANCE

RELATED APPLICATION

The disclosed apparatus generates average speed signals which may be utilized in a system to determine performance characteristics of a sailing boat as disclosed in the patent application of Lucian W. Taylor and George J. Eilers, entitled "System For Evaluating Sailboat Performance," Ser. No. 347,380 filed Apr. 3, 1973.

BACKGROUND OF THE INVENTION

1. Field of the Invention

This invention relates to a system for automatically determining performance characteristics of a sailing boat. The circuit utilizes instantaneous values of speed to generate running averages of boat speed and apparent wind speed to thereby enable a sailor to most efficiently sail the boat at the maximum hull speed under continuously varying conditions.

2. Description of the Prior Art

Many attempts have been made toward evaluating the performance of a sailboat in an effort to assure that the sailboat is performing as close to its "hull speed" as possible. It is well understood that sail design, hull design, sea conditions, and wind conditions cooperate in determining the speed of a sailboat. While, as pointed out, the above items determine boat speed, much of this basic information has never been properly checked from an emperical standpoint because there have been no systems employing really meaningful metering equipment. Since the inertia of a sailboat is high, the boat responds to an average wind speed and direction at an average boat speed over any period of time. Readings from instruments which provide instantaneous values of speed produce erroneous calculations of boat performance since an instantaneous value may vary significantly from an average value. Damped instruments are able to provide an average value over a short period of time but are confined to a single value of averaging period.

SUMMARY OF THE INVENTION

It is an object of the present invention to produce a circuit capable of ascertaining average boat speed and average apparent wind speed for use in a system for evaluating the performance of a sailboat.

Another object of the invention is to produce an averaging circuit with variable averaging periods to accommodate changes in the rate of fluctuation of the input signals.

Still another object of the invention is to produce an averaging circuit wherein means are provided to automatically sense average boat speed and average apparent wind speed either individually or in combination.

BRIEF DESCRIPTION OF THE DRAWINGS

FIG. 2 is a functional block diagram of the averaging circuits of FIG. 1;

DETAILED DESCRIPTION OF THE PREFERRED EMBODIMENT

Figure 1:
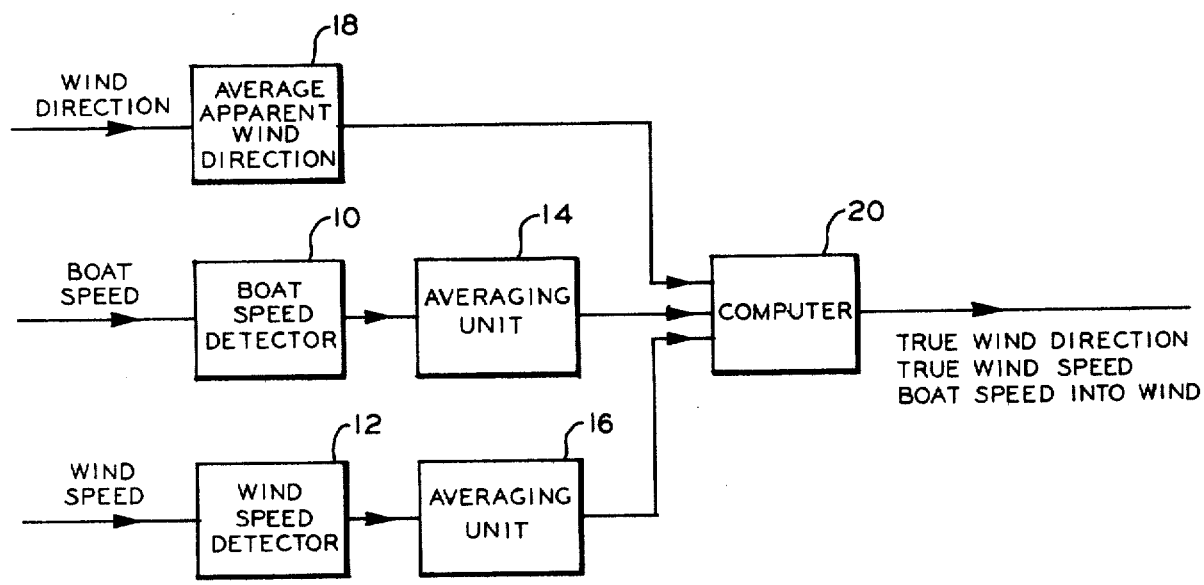
FIG. 1 is a functional block diagram of a system for ascertaining average apparent wind direction, average boat speed and average wind speed and utilizing them to automatically produce true wind direction, true wind speed and boat speed into the wind.

In sailboating, the accurate measurements of average apparent wind direction, average apparent wind speed and average boat speed are important whether it is desired to sail from point X to point Y in the shortest possible time or simply to determine if a new piece of equipment has changed the speed of the boat. FIG. 1 is a functional block diagram of the system for ascertaining average apparent wind direction, average boat speed and average wind speed and utilizing them to automatically produce true wind direction, true wind speed and boat speed into the wind. Boat speed detector 10 and wind speed detector 12 may be conventional units of known construction. The output signals from 10 and 12 are read by averaging units 14 and 16 which produce average boat speed and average apparent wind speed signals. Average apparent wind direction signals are provided by unit 18 which may be of the type disclosed in U.S. patent application Ser. No. 347,380 entitled "System For Evaluating Sailboat Performance" by Lucian W. Taylor and George J. Eilers. The average apparent wind direction from unit 18, the average boat speed signal from unit 14 and the average apparent wind speed from unit 16 are the inputs to computer 20 which may be a small general purpose unit of the type commonly referred to as "mini-computers." The computer provides output signals representing true wind direction, true wind speed and boat speed into the wind with which to evaluate the sailboat performance.

Referring to FIG. 2, there is shown a functional block diagram of averaging units 14 and 16 which share a common clock 22, update interval timer 24 and averaging time selector switch 26. Speed detectors 10 and 12 produce alternating current output signals with a frequency proportional to the speed being measured. Boat speed and wind speed signals enter pulse forming and shaping circuits 28 and 30 where the signals are amplified and shaped to produce a square wave output to accumulator circuits 32 and 34. The pulse trains from units 28 and 30 drive flip flops 36 and 38 which function as one-count temporary storage buffers in order to synchronize the pulse trains with the accumulator sampling rate. The output of flip flops 36 and 38 are sampled periodically by shift registers 40 and 42 which record a logic "1" signal if no pulse is present from circuits 28 and 30 and which record a logic "0" signal if a pulse is present from circuits 28 and 30. For a predetermined sampling rate, the more 0 pulses recored by shift registers 40 and 42 the higher the speed being measured by detectors 10 and 12. Shift registers 40 and 42 contain a fixed number of data bits, logic 0's and 1's which may be counted to provide a digital indication of the speed being measured. Each time flip flops 36 and 38 are sampled the new data bit replaces the oldest in the shift register. Therefore, the contents of the shift registers represent a running average of a fixed number of sampling operations. The rate of sampling is controlled by clock 22.

When shift registers 40 and 42 are not sampling the output of flip flops 36 and 38, the data bits are available at inputs 44-1 and 46-1 of NOR's 44 and 46. When the NOR's are enabled by clock 22 at inputs 44-2 and 46-2 and by update in interval timer 24 at inputs 44-3 and 46-3, decade counters 48 and 50 will count the number of data bits to produce a total binary count representing a running average of the speed. The average boat speed count may be utilized to drive indicator 52 or may be the input to a computer. The average wind speed count is delayed by latch 54 to compensate for the inertia of the boat which delays the response to a change in wind speed. The delayed wind speed count drives average wind speed indicator 56 or may be the input to a computer.

Figure 3:
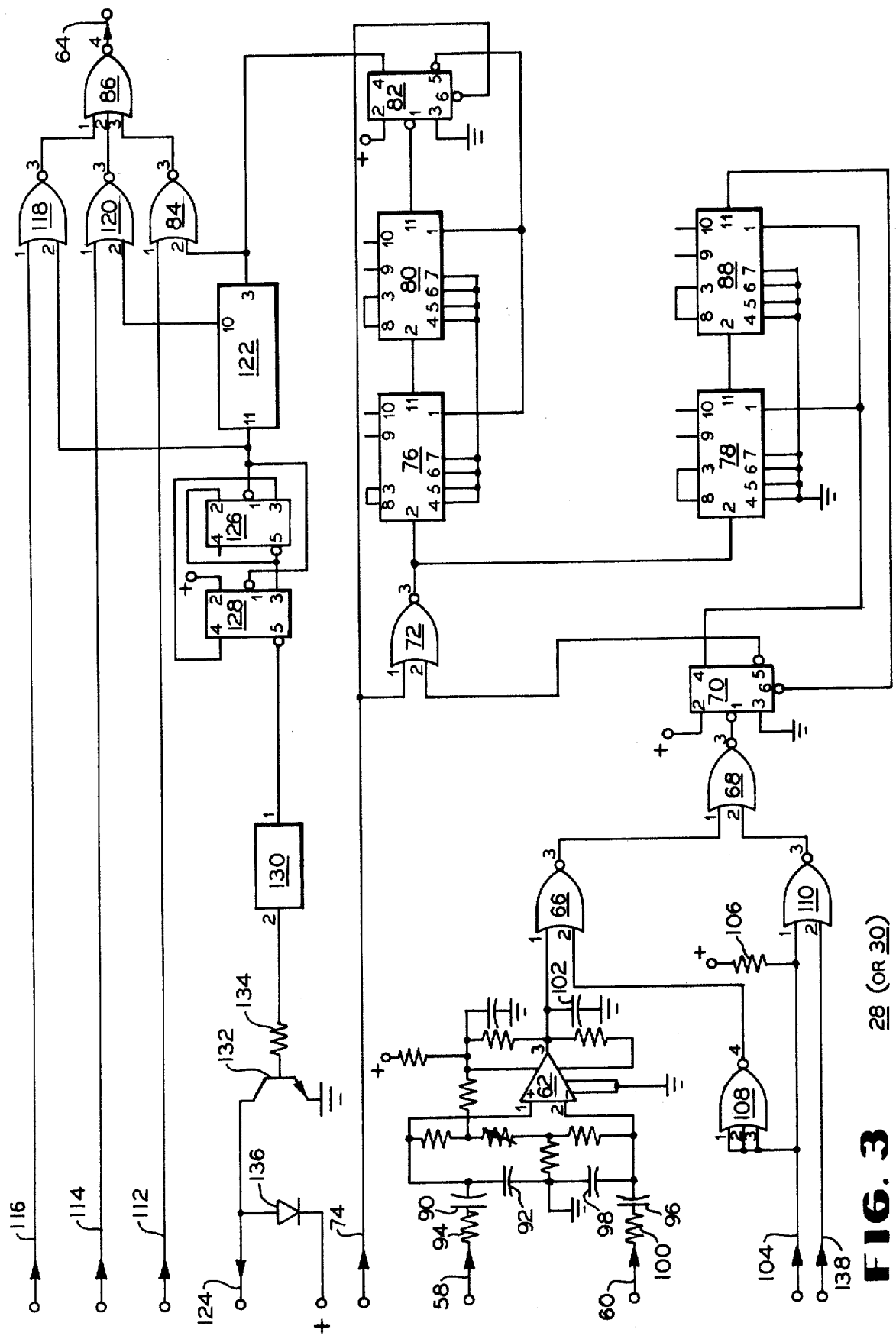
FIG. 3 is a schematic representation of the pulse forming and shaping circuits of FIG. 2.

FIG. 3 is a schematic representation of pulse forming and shaping circuits 28 and 30 of FIG. 2. A speed signal, either boat speed or apparent wind speed, typically in the form of alternating current with a minimum peak to peak amplitude of 20 millivolts and a frequency proportional to speed, is received from boat speed detector 10 or apparent wind speed detector 12 on input lines 58 and 60. Voltage comparator 62 amplifies and shapes the input signal to produce a square wave output which is then passed through frequency conversion circuits to generate a boat speed or wind speed pulse train to accumulator circuits 32 or 34 of FIG. 2 on output line 64.

The pulse train from comparator 62, which is of a frequency proportional to the speed being measured, is passed through NOR's 66 and 68 to the clock input of JK master/slave flip flop 70. The first clock pulse will produce an enabling signal to NOR 72 which places a high frequency pulse train from clock 22 of FIG. 2, on line 74, at the clock inputs of binary counters 76 and 78. Counters 76 and 80 divide the high frequency pulse train by 256 to produce a clock pulse at JK flip flop 82. Flip flop 82 is set by the clock pulse and reset from the high frequency line 74 so that a one count pulse corresponding in length to a pulse on line 74 is passed through NOR's 84 and 86 to output line 64. NOR 72 also supplies the high frequency pulse train to binary counters 78 and 88 which are enabled from flip flop 70 for the same period as NOR 72. Counters 78 and 88 divide the high frequency pulse train by 256 to produce a clear signal to flip flop 70 to ready it for the next pulse from comparator 62. Therefore, the pulse train from output line 64 will be at the same frequency as the input signals on lines 58 and 60 but the pulses will be of a constant width with the time between them varying as the frequency changes.

Element 62 is a voltage comparator with non-inverting input 62-1 and inverting input 62-2 connected to input lines 58 and 60. Assuming line 60 is the zero voltage reference for the incoming alternating current speed signal, then during the positive half cycle capacitors 90 and 92 will be charged through current limiting resistor 94 and the voltage across capacitor 92 at input 62-1 will be amplified to produce an output signal at output 62-3. During the negative half cycle, line 60 will be positive with respect to line 58 and capacitors 96 and 98 will be charged through current limiting resistor 100. The voltage across capacitor 98 at input 62-2 will be amplified and inverted to produce a negative output signal at output 62-3. Capacitor 102 is alternately charged and discharged by the output from comparator 62 such that during the charging cycle a voltage level is reached which represents logic 1 at input 66-1 of NOR 66. This 1 will remain until during the discharge cycle the voltage again passes the logic level and a 0 is produced. If both inputs to NOR 66 are at 0, output 66-3 will be at 1. For any other combination of inputs output 66-3 will be 0. During the normal operation of the averaging circuit, averaging time selector switch 26 of FIG. 2 is in a position other than the test position so there is no signal on test input line 104. Resistor 106 provides a 1 to all the inputs of three-input NOR 108 from a positive power supply to produce a 0 at output 108-4 to enable NOR 66 at input 66-2. When capacitor 102 is charged to produce a 1 at input 66-1, output 66-3 will be at 0 and when a 0 is at input 66-1, output 66-3 will be at 1 so that a square wave pulse train is generated which corresponds in frequency to the speed input signal on lines 58 and 60.

The 1 from resistor 106 is also present at input 110-1 of NOR 110 to produce a 0 at input 68-2 to enable NOR 68. The output at 68-3 will be the complement of the pulse train from output 66-3 and each 1 pulse will correspond with the positive half cycle of the speed input signal. Element 70 is a JK master/slave flip flop. Signals on J input 70-2 and K input 70-3 will determine the output signal at 70-4 and its complement at 70-5 when the signal at clock input 70-1 changes from 1 to 0. If inputs 70-2 and 70-3 are both at 0, outputs 70-4 and 70-5 will remain in their previous states. If input 70-2 is at 0 and input 70-3 is at 1, output 70-4 will change to 0 and output 70-5 will change to 1. If input 70-2 is at 1 and input 70-3 is at 0, output 70-4 will change to 1 and output 70-5 will change to 0. If input 70-2 and 70-3 are both at 1, outputs 70-4 and 70-5 will change to the complement of the previously present signals. Since input 70-2 receives a 1 from a positive power supply and input 70-1 receives a 0 from ground, a change from 1 to 0 at clear input 70-6 will produce a 0 at output 70-4 and a 1 at output 70-5. When the first 1 pulse from output 68-3 changes to 0, output 70-5 will change from 1 to 0 to enable NOR 72 at input 72-2. Clock 22 of FIG. 2 sends a high frequency pulse train, approximately one pulse each 7.1 microseconds, which is received on high frequency clock line 74. When NOR 72 is enabled at input 72-2 by the 0 from output 70-5, NOR 72 will produce the complement of the pulse train on line 74 at output 72-3 to binary counters 76 and 78.

Binary counter 76 has two modes of operation. If a 0 is present at count/load input 76-1, the signals at data inputs 76-4, 76-5, 76-6 and 76-7 are transferred to data outputs 76-8, 76-9, 76-10 and 76-11 respectively to preset the counter. If a 1 is present at count/load input 76-1, a pulse train at clock one input 76-2 will be divided by two at output 76-8 and a pulse train at clock two input 76-3 will be divided by eight at output 76-11. The high frequency pulse train on line 74 is continuously clearing JK flip flop 82 at clear input 82-6 so that output 82-5 remains at 1 which is present at count/load inputs 76-1 and 80-1 of binary counters 76 and 80. Since data inputs 76-4, 76-5, 76-6, 76-7, 80-4, 80-5, 80-6 and 80-7 are connected to ground, data outputs 76-8, 76-11, 80-8 and 80-11 will be at 0 if it is assumed the counters have previously been preset. When NOR 72 is enabled, the pulse train on line 74 will be divided by two at output 76-8 which is the input to clock two input 76-3 to produce a division by 16 at output 76-11. Counter 80 also produces a division by 16 so that output 80-11 will produce a 1 pulse for every 255 pulses at clock one input 76-2. After producing the 1 pulse, the next count will return output 80-11 to 0 which clocks flip flop 82 at clock input 82-1 to change output 82-5 to 0. This 0 appears at count/load inputs 76-1 and 80-1 to preset outputs 76-8, 76-11, 80-8 and 80-11 to 0 so that counters 76 and 80 are reset for another cycle of 256 counts as previously assumed. At the same time output 70-5 changes to 0 output 70-4 changes to 1 at count/load inputs 78-1 and 88-1. Binary counters 78 and 88 will also produce a 1 pulse at output 88-11 for every 255 pulses at clock one input 78-2. After producing the 1 pulse, the next count will return output 88-11 to 0 which resets flip flop 70 at clear input 70-6. Output 70-5 will change back to 1 to disable NOR 72 and output 70-4 will change to 0 to preset outputs 78-8, 78-11, 88-8 and 88-11 to 0 so that counters 78 and 88 are reset to 0 for another cycle of 256 counts.

If the frequency of the speed signal on lines 58 and 60 does not correspond to the desired frequency of the pulse train output signal on line 64, counters 76, 80, 78 and 88 may be utilized to convert the input frequency. Counters 78 and 88 may be preset to form the numerator and counters 76 and 80 may be preset to form the denominator of a fraction which when multiplied times the input frequency will produce the desired output frequency. If, for example, the input frequency on lines 58 and 60 is twice the desired output frequency, counters 78 and 88 may be preset to binary 128 by providing 0 signals at data inputs 78-4, 78-5, 78-6, 78-7, 88-4, 88-5 and 88-6 and a 1 signal at data input 88-7. When the first pulse is received at input 70-1, counters 78 and 88 will count 128 pulses before resetting flip flop 70 and disabling NOR 72 thus allowing counters 76 and 80 to only count to 128. The second pulse at input 70-1 will again permit counters 78 and 88 to count 128 pulses, having been preset to 128, before resetting flip flop 70. Counters 76 and 80 will also have counted 128 pulses for a total of 256 to produce a 1 pulse at output 88-11 and then preset counters 76 and 80 to zero for another cycle of 256 counts. Therefore, counter 80 will produce a single 1 pulse for each two pulses at input 70-1. Counters 76 and 80 may also be preset with a number so that the fraction may vary between (1/256) and (256/1). In this manner pulse forming circuit 28 (or 30) may be utilized with a number of different speed detectors which may have different output signal frequencies for a particular value of speed.

When output 82-5 changes to 0 output 82-4 is changed to "1" and then is changed back to 0 by the next high frequency pulse at clear input 82-6. Therefore, output 82-4 will be at 0 except for a one high frequency pulse length period each time a speed pulse is applied to clock input 70-1. Averaging time selector switch 26 of FIG. 2 may be set to one of four positions; test input, a 15 second averaging period, a 1 minute averaging period or a 2 minute averaging period. If switch 26 is set for a 15 second averaging period, input line 112 will be at 0 while test input line 104, 1 minute input line 114 and 2 minute input line 116 will be at 1. The 0 on line 112 is present to enable NOR 84 at input 84-1 so that output 84-3 will be at 1 except for a 0 pulse for each 1 from flip flop 82. Lines 114 and 116 supply a 1 to inputs 118-1 and 120-1 of NOR's 118 and 120 to produce a 0 at inputs 86-1 and 86-2 to enable NOR 86. The 1 from output 84-3 at input 86-3 will produce a 0 at output 86-4 which is interrupted by a 1 pulse for each 1 from flip flop 82. Therefore, the signal on pulse train output line 64 will be a 1 pulse for each pulse from flip flop output 82-4 which is the same width as a high frequency pulse cycle on line 74.

Clock two input 122-3 of binary counter 122 also receives the 1 pulses from flip flop 82 which are divided by four at output 122-10 and divided by eight at output 122-11. If a one minute averaging period is selected, input line 114 will be at 0 to enable NOR 120 at input 120-1 and the signal from output 122-10 will produce a 0 pulse for every four 1 pulses from flip flop 82. NOR 86 is enabled at inputs 86-1 and 86-3 by a 0 from NOR's 118 and 84 which have inputs 118-1 and 84-1 at 1. Therefore, the signal on pulse train output line 64 will be a 1 pulse for each four pulses from flip flop output 82-4 which is the ratio of a 1 minute averaging period to a 15 second averaging period. If a 2 minute averaging period is selected, NOR 118 is enabled by a 0 on input line 116 at input 118-1 while lines 112 and 114 are at 1. A 1 pulse from output 122-11 at input 118-2 will produce a 1 pulse on line 64 for each eight pulses from flip flop output 82-4 which is the ratio of a 2 minute averaging period to a 15 second averaging period.

The "divided by eight" output from 122-11 is also utilized to produce a log counter signal on line 124 of one pulse each 0.01 nautical mile. In the present invention flip flop 82 will produce a boat speed pulse rate of 20/3 pulses per second per knot which is divided by eight by counter 122. Flip flops 126 and 128 provide a further signal division by a factor of three. Since flip flops 126 and 128 are not provided with a clear signal output 128-5 will be at 1 from the previous count signal. When a first clock pulse from output 122-11 is received output 128-5 will change from 1 to 0 and output 128-4 will change from 0 to 1 since input 128-2 is at 1. Assuming that output 126-5 is at 0, which is present at J input 126-1, a second clock pulse received at clock input 126-1 will change output 126-5 from 0 to 1 since input 126-3 receives a 1 from output 128-4. Now a third clock pulse at clock inputs 126-1 and 128-1 will change output 126-5 to 0 as was assumed above and will change output 128-5 to 1 to produce a single 1 pulse for every three pulses from output 122-11. To obtain the boat speed log counter signal, output 128-5 is connected to input 130-1 of decade counter 130 which divides the signal by 10 at output 130-2 which in turn is connected to the base of NPN transistor 132 by resistor 134. A 0 at resistor 134 turns off transistor 132 while a 1 turns transistor 132 on so that current may flow from input line 124 to ground through the transistor. If, for example, line 124 is connected to a positive power supply through the primary winding of a pulse transformer the alternate 1 and 0 pulses representing speed would generate current pulses on line 124 at the rate of 100 pulses per hour per knot or 0.01 pulse per nautical mile. Diode 136 is reverse biased by a positive power supply so that if the voltage at the collector of transistor 132 exceeds the value of the power supply and the forward voltage drop of the diode, current will flow to clamp the signal on log counter output line 124 at a predetermined voltage level. The log counter signal on line 124 may be utilized to actuate a mechanical counter to provide an indication of the total distance traveled.

When averaging time selector switch 26 is in the test position, test input line 104 receives a 0 which produces a 1 from NOR 108 to disable NOR 66 and prevent the speed pulses from reaching flip flop 70. NOR 66 will generate a 0 which enables NOR 68 at input 68-1. Clock 22 of FIG. 2 produces a test frequency on line 138 at input 110-2 of NOR 110. NOR 110 is enabled at input 110-1 by the 0 on line 104 and the complement of the test frequency appears at input 68-2. NOR 68 generates the test frequency at clock input 70-1 of flip flop 70. Input line 112 also receives a 0 to enable NOR 84 at input 84-1 so that the signal on pulse train output line 64 represents the test frequency signal on input line 138. This test frequency output will produce known values on indicators 52 and 56 of FIG. 2 so that the operation of the circuit may be checked automatically.

Figure 4:
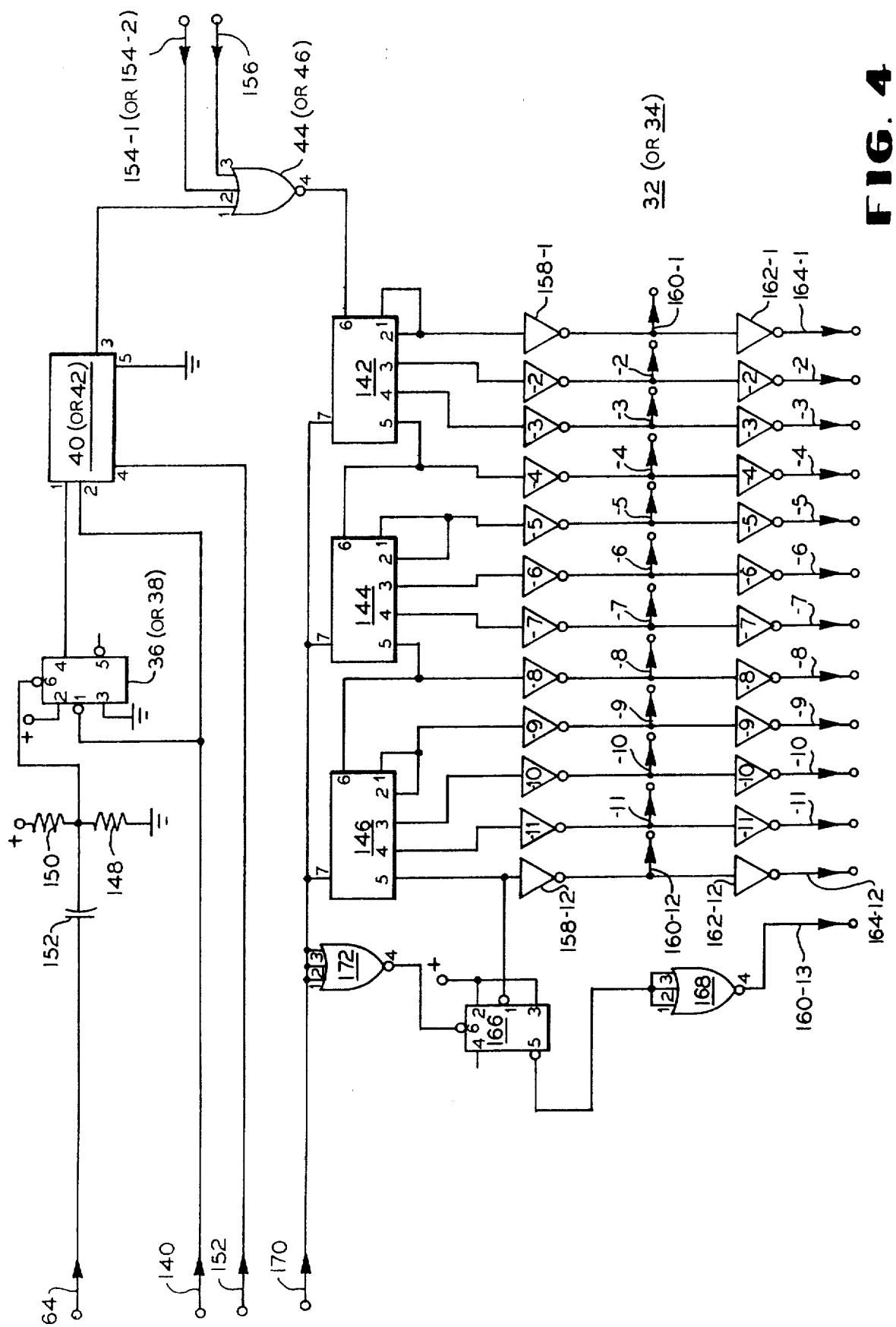
FIG. 4 is a schematic representation of the accumulator circuits of FIG. 2.

FIG. 4 is a schematic representation of accumulator circuits 32 and 34 of FIG. 2. Line 64 receives the pulse train from pulse forming circuit 28 (or 30) which resets flip flop 36 (or 38) once every 150 milliseconds assuming a boat speed of 1 knot (once every 750 milliseconds assuming a wind speed of 1 knot). Flip flop 36 (or 38) also receives a clock pulse approximately every 14.6 milliseconds or 1024 times per 15 second averaging period from clock 22 on count/circulate line 140 to synchronize the pulse train on line 64 with the sampling rate of shift register 40 (or 42). NOR 44 (or 46) gates the shift register output to a decade counter comprised of counter elements 142, 144 and 146 which provide a count total to average boat speed indicator 52 and latch 54 of FIG. 2. In the absence of a pulse on line 64, clear input 36-6 is supplied with a 1 from a voltage divider comprised of resistor 148 connected to ground and resistor 150 connected to a positive power supply. When a speed pulse appears on line 64 it is differentiated by capacitor 152 to provide a brief 0 pulse at clear input 36-6 which sets output 36-4 to 0. Now the first count/circulate 1 pulse on line 140 will clock flip flop 36 at clock input 36-1 and change output 36-4 to 1. Thereafter each count/circulate pulse will cause output 36-4 to remain at 1 until the next speed pulse on line 64 resets output 36-4 to 0.

Element 40 (or 42) is a recirculating shift register with a 1024 bit capacity. Data at input 40-1 is entered into the shift register if a 1 is present at write/recirculate input 40-2 and clock input 40-4 and a 0 is present at chip select input 40-5. Clock input 40-4 receives a clock pulse aproximately every 14.3 microseconds from clock 22 on line 152. Therefore, each time a count/circulate pulse appears on line 140, shift register 40 will read the signal at flip flop output 36-4. In the case of a boat speed of 1 knot, 1 pulse every 150 milliseconds, shift register 40 will read one 0 for the first count/circulate pulse on line 140 after flip flop 36 has been cleared and then nine 1 signals for the next nine count/circulate pulses before a speed pulse again appears on line 64 to clear flip flop 36. As the frequency of the speed pulses increases less 1 signals will be ready by shift register 40 for each 0 signal. Between count/circulate pulses on line 140 write/recirculate input 40-2 will be at 0. During this period count pulses are received approximately every 14.3 microseconds for a total of 1024 pulses at clock input 40-4 to cause the data bits in the shift register to circulate through the register from input 40-1 to output 40-3 with each bit appearing in the order in which it was read. After all bits have appeared at output 40-3 and have been recirculated a new data bit is read from output 36-4 of flip flop 36 and the oldest data bit is discarded. Therefore, the contents of shift register 40 represent the last 1,024 data bits to have been received from flip flop 36.

As shift register 36 is recirculated, each of the 1,024 data bits appears at input 44-1 of three-input NOR 44. Input 44-2 receives a clock enable signal from clock 22 on line 154-1 approximately every 7.1 microseconds for boat speed and approximately every 14.3 microseconds on line 154-2 for wind speed in the form of a 0 when each data bit appears at input 44-2. Input 44-3 receives an update signal on line 156 from update interval timer 24 of FIG. 2 in the form of a 0 pulse of approximately 58.6 milliseconds duration to enable NOR 44 to generate the complement of each data bit from shift register 40 during recirculation. Therefore, each 0 in register 40 representing a speed pulse becomes a 1 and each 1 in register 40 representing the absence of a speed pulse becomes a 0 at input 142-6 of decade counter 142. The duration of the update signal permits the decade counter to count for four recirculation periods for a total of 8,192 bits for boat speed and 4,096 bits for wind speed. When BD input 142-1 is connected to A output 142-2, decade counter 142 will count 1 pulses at input 142-6 and display the total number of pulses counted in binary form at outputs 142-2, 142-3, 142-4 and 142-5 with output 142-2 representing binary one, output 142-3 representing binary two, output 142-4 representing binary four and output 142-5 representing binary eight. By connecting output 142-5 to input 144-6 and output 144-5 to input 146-6 counters 142, 144 and 146 will count in series to a maximum of 4,095 counts with output 142-2 representing binary one and output 146-5 representing binary 2,048. The binary number from the counter outputs is changed to its complement by inverters 158-1 through 158-12 and sent to average boat speed indicator 52 of FIG. 2, if boat speed is being averaged, on output lines 160-1 through 160-12. If wind speed is being averaged, the signals from inverters 158-1 through 158-12 pass through another set of inverters, 162-1 through 162-12, and are sent on output lines 164-1 through 164-12 to latch 54 of FIG. 2 as the same signals that are present at the outputs of counters 142, 144 and 146. Output 146-5 of counter 146 is also connected to clock input 166-1 of flip flop 166 to provide an additional binary place in the average boat speed count on line 160-13. When count 4,095 is registered all counter outputs are at 1. The next count will change all counter outputs to 0 which sets flip flop 166 at input 166-1. Assuming flip flop 166 has previously been cleared, output 166-5 will be at 1 and will change to 0 at the three inputs to NOR 168. Output 168-4 changes from 0 to 1 to indicate count 4,096 on output line 160-13. Now counters 142, 144 and 146 are able to count another 4,095 pulses for a maximum of binary 8191 at average boat speed output lines 160-1 through 160-13.

Approximately every 3.75 seconds a 1 pulse appears on reset line 170 while update line 156 is at 1 to disable NOR 44 and prevent pulses from shift register 40 from being counted by counters 142, 144 and 146. This 1 pulse on line 170 resets counters 142, 144 and 146 at reset inputs 142-7, 144-7 and 146-7 so that all the counter outputs are at 0. Line 170 also supplies a 1 to the inputs of NOR 172 to change output 172-4 to 0 to clear flip flop 166 at input 166-6 which sets output 166-5 to 1 as was previously assumed. A 1 on the inputs to NOR 168 generates a 0 at output 168-4 to clear output line 160-13. When line 170 returns to 0 line 156 changes to 0 to enable NOR 44 and allow counters 142, 144 and 146 to register another total. Approximately every 3.75 seconds the counters are cleared and then reset from shift register 40.

Figure 5:
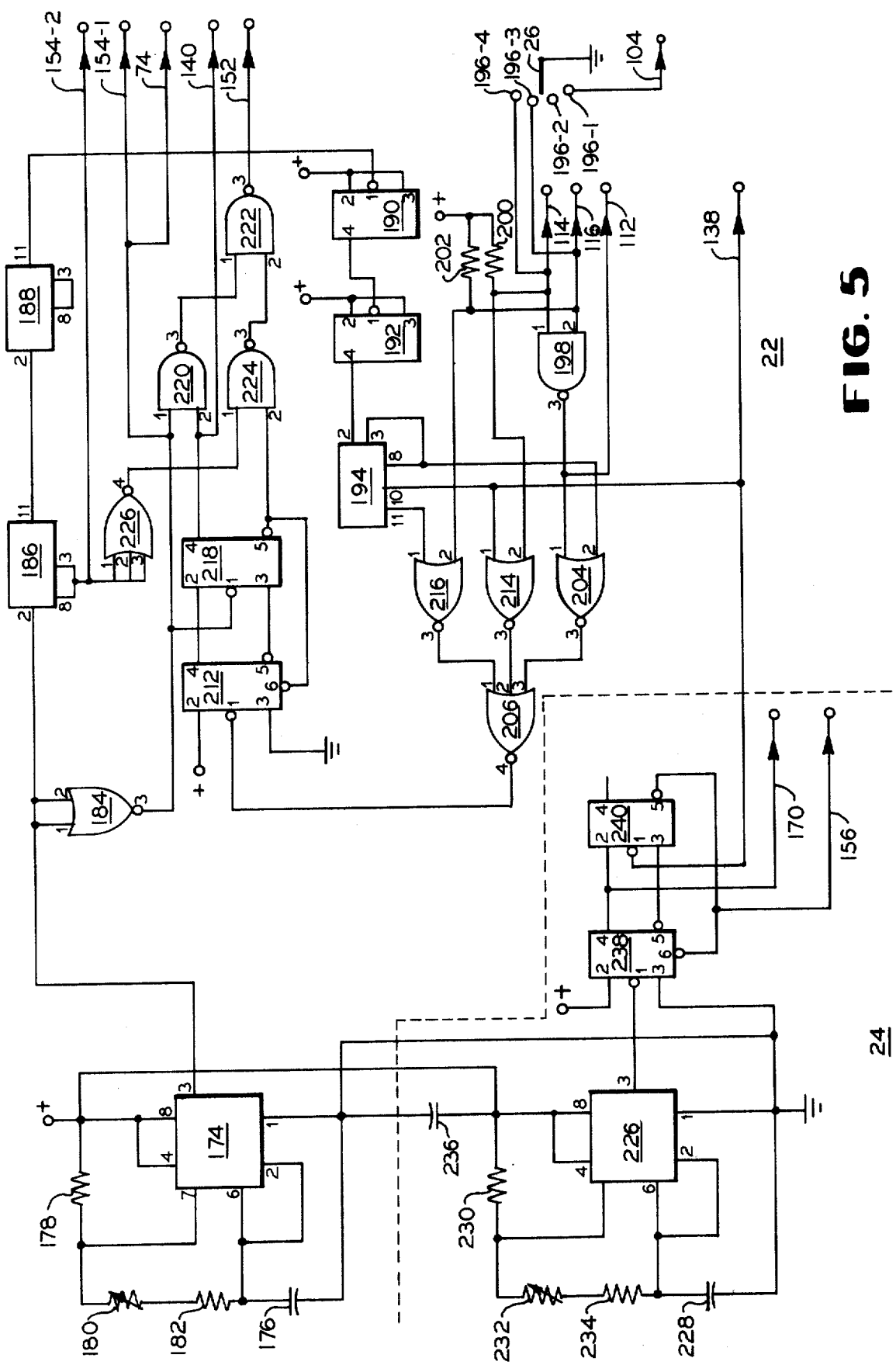
FIG. 5 is a schematic representation of the clock, update interval timer and averaging timer selector switch of FIG. 2.

FIG. 5 is a schematic representation of clock 22, switch 26 and update interval timer 24 of FIG. 2. Clock 22 generates an enable signal on clock enable line 154-1 to boat speed accumulator circuit 32 and a second enable signal, with one-half the frequency, on clock enable line 154-2 to wind speed accumulator circuit 34. The enable signal on line 154-1 is also sent on high frequency line 74 to both accumulators. Clock 22 also produces a count/circulate signal on line 140 and a clock signal on line 152 for both accumulator circuits. Update interval timer 24 provides a reset signal on line 170 to both accumulator circuits and an update signal on line 156 to latch 54 and both accumulator circuits. Averaging time selector switch 26 provides a 0 on line 114 for a 1 minute averaging period, a 0 on line 116 for a 2 minute averaging period or a 0 on line 104 for a test input signal to pulse forming circuits 28 and 30 of FIG. 3.

Element 174 is a monolithic timing circuit with reset input 174-4 connected to power supply input 174-8 and trigger input 174-2 connected to threshold input 174-6 so as to operate as an astable multivibrator. Capacitor 176, connected between ground terminal 174-1 and threshold input 174-6, will charge through resistors 178, 180 and 182 to the threshold voltage level at which time capacitor 176 will discharge through resistors 180 and 182 into discharge input 174-7. As capacitor 176 is charging, output 174-3 will be at 0 and when capacitor 176 is discharging output 174-3 will be at 1. Resistor 180 is a variable resistor which may be utilized to change the frequency of the output signal.

Output 174-3 supplies a pulse train with a period of approximately 7.1 microseconds to the inputs of NOR 184 which produces the complement of the pulse train on clock enable line 154-1 and high frequency output line 74. Binary counter 186 also receives the pulse train at clock one input 186-2 and produces a division by two at output 186-8 to generate a clock enable pulse train on line 154-2 of one-half the frequency of the pulse train on line 154-1. Output 186-8 is connected to input 186-3 to produce a further division by eight for a total division by 16 at output 186-11. Binary counter 188 produces a second division by 16 for a total division by 256 at output 188-11. With J input 190-2 and K input 190-3 both at 1, output 190-4 of flip flop 190 will alternate between 1 and 0 as the pulse train is received at clock input 190-1 to provide a division by two. Flip flop 192 provides a second division by two so that the pulse train from output 174-3 has undergone a frequency division of 1,024 when it reaches output 192-4. Binary counter 194 receives this pulse train at clock one input 194-2 and produces a division by two at output 194-3 so that the pulse train cycle is approximately 14.6 milliseconds. If selector switch 26 is positioned at the 15 second averaging interval switch terminal 196-2, inputs 198-1 and 198-2 of NAND 198 will be supplied with a 1 from a positive power supply through resistors 200 and 202. NAND 198 will produce a 1 at output 198-3 if either or both inputs are at 0 and a 0 at output 198-3 if both inputs are at 1. Input 204-1 of NOR 204 is therefore enabled by a 0 from output 198-3 and will produce the complement of the pulse train from output 194-3 at input 206-3 of NOR 206. A 1 at input 216-2 of NOR 216 from resistor 202 and a 1 at input 214-2 of NOR 214 from resistor 200 produces a 0 at inputs 206-1 and 206-2 to enable NOR 206 to produce the pulse train from output 194-3 at clock input 212-1 of flip flop 212.

If switch 26 is positioned at the 1 minute averaging interval switch terminal 196-4, input 198-1 will be at 0 to produce a 1 at input 204-1 and disable NOR 204. The 0 from switch 26 enables NOR 214 at input 214-2 to produce the complement of the pulse train from output 194-10 of binary counter 194. Output 194-10 is the divide by eight output and produces a pulse train cycle of approximately 58.6 milliseconds. NOR 206 is enabled with a 0 at inputs 206-1 and 206-3 to produce the pulse train from output 194-10 at clock input 212-1 of flip flop 212. The pulse train from output 194-10 is also sent to pulse forming circuits 28 and 30 of FIG. 3 on test frequency line 138. If switch 26 is positioned at the two minute averaging interval switch terminal 196-3, input 198-2 will be at 0 to produce a 1 at input 204-1 and disable NOR 204. The 0 from switch 26 enables NOR 216 at input 216-2 to produce the complement of the pulse train from output 194-11 of binary counter 194. Output 194-11 is the divide by sixteen output and produces a pulse train cycle of approximately 117 milliseconds. NOR 206 is enabled with a 0 at inputs 206-1 and 206-3 to produce the pulse train from output 194-11 at clock input 212-1 of flip-flop 212.

Each time the pulse train switches from 1 to 0 at clock input 212-1, once per pulse train cycle, the 1 at J input 212-2 and the 0 at K input 212-3 will produce a 1 at J input 218-2 and a 0 at K input 218-3 of flip flop 218. Clock input 218-1 receives the complement of the pulse train from timer 174 and outputs 218-4 and 218-5 are set to 1 and 0 respectively. The 0 from output 218-5 is received at clear input 212-6 and flip flop 212 is reset to produce a 0 at input 218-2 and a 1 at input 218-3. Approximately 7.1 microseconds after the first clock pulse a second clock pulse is received at clock input 218-1 to set outputs 218-4 and 218-5 to 0 and 1. Therefore, once during each pulse train cycle from NOR 206 output 218-4 produces a 1 pulse and output 218-5 produces a 0 pulse with a pulse width of approximately 7.1 microseconds. The 1 pulse from output 218-4 is sent to accumulator circuits 32 and 34 of FIG. 4 on count/circulate line 140.

The complement of the pulse train from timer output 174-3 is also present at input 220-1 of NAND 220. During the major portion of the pulse train cycle generated by NOR 206, output 218-4 produces a 0 at input 220-2 to generate a 1 at output 220-3. However, as previously stated, output 218-4 is at 1 for approximately 7.1 microseconds to enable NAND 220 to produce a 0 pulse when both inputs are at 1. Therefore, NAND 222 will be enabled at input 222-1 by a 1 from output 220-3 and disabled during the 0 pulse from output 220-3. NAND 224 is enabled at input 224-2 by a 1 from output 218-5 to produce the complement of the pulse train from NOR 226 which receives the clock enable signal that is present on line 154-2 from binary counter output 186-3. NAND 222 then produces a clock pulse train on line 152 to accumulator circuits 32 and 34 of FIG. 4 which is the complement of the clock enable pulse train on line 154-2.

Timing circuit 226 of update interval timer 24 produces a 1 at output 226-3 when capacitor 228 is charging through resistors 230, 232 and 234 and a 0 at output 226-3 when capacitor 228 is discharging through resistors 232 and 234. Resistor 232 is variable to change the pulse train cycle period which is set at approximately 3.75 seconds. Timing circuits 174 and 226 share a common power supply and ground, therefore, capacitor 236 is provided to bypass any ripple on the power supply to ground to prevent false triggering of timing circuit 226 which would alter its relatively slow output frequency. Clock input 238-1 of flip flop 238 receives the pulse train from output 226-3 and since J input 238-2 is at 1 and K input 238-3 is at 0 outputs 238-4 and 238-5 will change to 1 and 0 when the signal at clock input 238-1 changes from 1 to 0 once every 3.75 seconds. Clock input 240-1 receives a pulse train with a period of approximately 58.6 milliseconds from output 194-4 of binary counter 194 to change output 240-5 from 1 to 0. This 0 is present at clear input 238-6 to reset flip-flop 238 to 0 at output 238-4 and 1 at output 238-5. 58.6 milliseconds after flip flop 240 was set another clock pulse at clock input 240-1 will set output 240-5 to 0. Therefore, each time flip flop 238 is set, once every 3.75 seconds, output 238-4 will produce a 1 pulse on reset line 170 to accumulator circuits 32 and 34 of FIG. 4. Each time flip flop 240 is set and reset, once every 3.75 seconds, output 240-5 will produce a 0 pulse on update line 156 to accumulator circuits 32 and 34 of FIG. 5 and latch 54 of FIG. 2.

Figure 6:
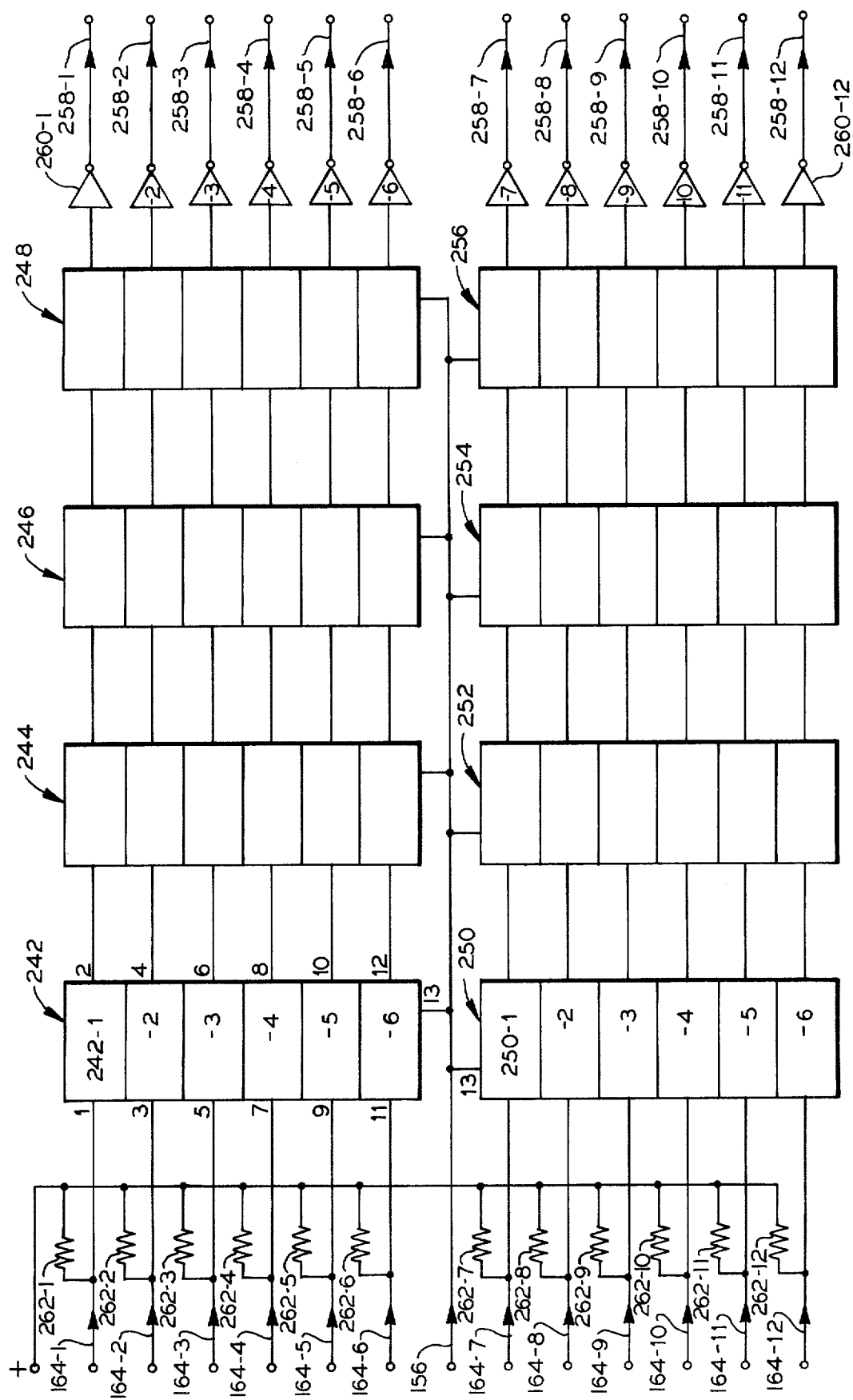
FIG. 6 is a schematic representation of the latch of FIG. 2.

FIG. 6 is a schematic representation of latch 54 of FIG. 2. Lines 164-1 through 164-12 receives the binary number representing the total number of wind speed pulses from accumulator circuit 34 of FIG. 4. Each input signal on lines 164 must pass through four latch sections, each section holding the signal for approximately 3.75 seconds between update signals on line 156, to provide a delay before the signal appears on output lines 258 and is sent to average wind speed indicator 56 of FIG. 2. Element 242 is a latch comprised of six D-type flip flops with a common clock input 242-13. When a 1 appears at clock input 242-13 the signals at D inputs 242-1, 242-3, 242-5, 242-7, 242-9 and 242-11 are transferred to outputs 242-2, 242-4, 242-6, 242-8, 242-10 and 242-12 respectively.

Latches 242 and 250 receive the binary signals on lines 164 as they are sent from accumulator circuit 34 of FIG. 4. Thereafter, the first update pulse to be received on line 156 will clock latches 242 and 250 at inputs 242-13 and 250-13 and the signals on lines 164 will appear at the outputs of latches 242 and 250. At the same time the decade counter of accumulator circuit 34 has been reset and new binary numbers are generated on lines 164. Approximately 3.75 seconds after the first update pulse a second update pulse will appear on line 156 and the original signals will be transferred to the outputs of latches 244 and 252 while the new signals are transferred to the outputs of latches 242 and 250. After two more update pulses the original signals, having passed through latches 246, 254, 248 and 256, will appear at the outputs of latches 248 and 256 to be inverted by inverters 260-1 through 260-12 on output lines 258-1 through 258-12. These signals are then sent to indicator 56 of FIG. 2 to produce an average wind speed reading. Resistors 262-1 through 262-12 are connected between a positive power supply and input lines 164 to provide a 0 signal on output lines 258 when no signal is present at input line 164.

Figure 7:
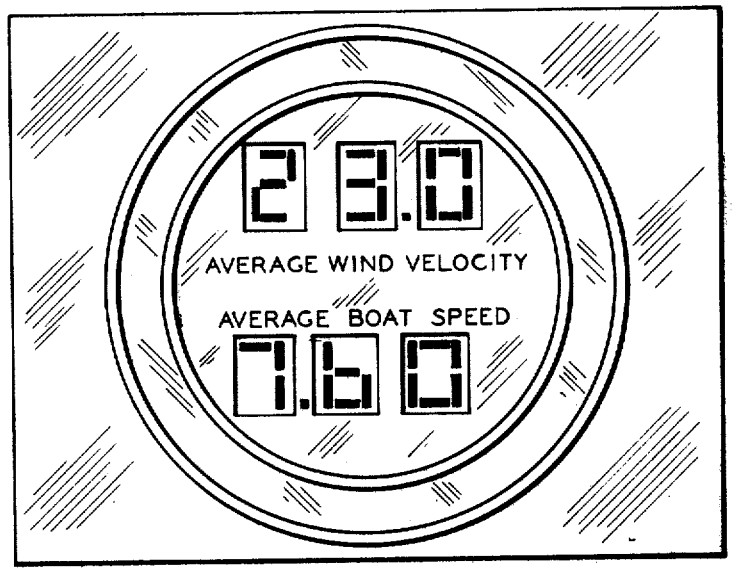
FIG. 7 illustrates the display portions of the average boat speed indicator and the average wind speed indicators of FIG. 2.

FIG. 7 shows the visual display portion of average boat speed indicator 52 and average wind speed indicator 56 of FIG. 2. Average wind speed may be displayed up to maximum value of 99.9 knots in increments of 0.1 knot. If a masthead anemometer is utilized as the wind speed detector 12, the minimum detectable wind speed is limited by bearing friction and is typically in the range of 2 to 3 knots. Average boat speed may be displayed up to maximum of 9.99 knots with the ability to add a 10's place display for boats which may exceed this speed. Boat speed detectors typically are limited to a mininum detectable speed of 0.1 knot which is less than steerage way for a sailboat.

In summary, the averaging circuits described herein produce a running average of boat speed and wind speed over one of several preselected averaging periods and display both signals with wind speed delayed 15 seconds with respect to boat speed to compensate for the inertia of the boat. Since running averages are indicated, the fluctuations in instantaneous wind and boat speed are removed to provide an accurate measurement of the actual boat performance over each averaging period.

Although the present invention has been disclosed in terms of providing average apparent boat speed and wind speed signals, the averaging circuits may be utilized to produce a running average of any cyclic input signal over a preselected period of time. The speed of land and air vehicles and the rate of flow past a point in a manufacturing process are examples of the other possible applications where an accurate measurement of speed is necessary.

In accordance with the provisions of the patent statutes, we have explained the principle and mode of operation of our invention and have illustrated and described what we now consider to represent its best embodiment. However, we desire to have it understood that the invention may be practiced otherwise than as specifically illustrated and described without departing from its spirit or scope.

What we claim is:

1. A system for evaluating sailboat performance comprising:
a signal source representing apparent wind direction;
means responsive to said apparent wind direction signal source for producing an average apparent wind direction signal;
a source of a continuous input signal representing apparent wind speed;
means responsive to said apparent wind speed signal source for producing a running average apparent wind speed signal;
a source of a continuous input signal representing boat speed;
means responsive to said boat speed signal source for producing a running average boat speed signal;
means for time delaying said running average apparent wind speed signal relative to said running average boat speed signal to compensate for the effect of the inertia of said sailboat; and
means responsive to said time delayed average apparent wind direction signal, said running average apparent wind speed signal, and said running average boat speed signal for displaying said average signals whereby sailboat performance characteristics can be determined.

2. A system according to claim 1 wherein at least one of said continuous input signals is cyclic.

3. A system according to claim 1 wherein at least one of said continuous input signals is a pulse train.

4. A system according to claim 1 wherein said means for delaying includes at least one latch and means for clocking said latch to transfer said running average apparent wind speed signal to the outputs of said latch a predetermined time interval after said signal appears at the inputs to said latch.

5. A system according to claim 1 wherein said means responsive to said average signals are visual indicators.

6. A system according to claim 1 wherein said means responsive to said average signals is a computer.

7. A system according to claim 1 wherein each of said means for producing a running average includes means for sampling the corresponding one of said input signals at a predetermined frequency and storing N of said samples, adding the most recent sample and discarding the oldest sample at periodic intervals, for said running averages.

* * * * *